United States Patent
Singh (10) Patent No.: US 12,436,919 B2
(45) Date of Patent: *Oct. 7, 2025

(54) SORTED ENTROPY CHUNKS FOR HIGHER SPACE REDUCTION

(71) Applicant: Cohesity, Inc., San Jose, CA (US)

(72) Inventor: Sweetesh Singh, New Delhi (IN)

(73) Assignee: Cohesity, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/925,675

(22) Filed: Oct. 24, 2024

(65) Prior Publication Data

US 2025/0139058 A1    May 1, 2025

Related U.S. Application Data (63) Continuation of application No. 18/497,635, filed on Oct. 30, 2023, now Pat. No. 12,197,389.

(51) Int. Cl.
  *G06F 16/174*    (2019.01)
(52) U.S. Cl.
  CPC ...... *G06F 16/1748* (2019.01); *G06F 16/1744* (2019.01)
(58) Field of Classification Search
  CPC ............. G06F 16/1748; G06F 16/1744
  See application file for complete search history.

(56) References Cited

U.S. PATENT DOCUMENTS

| | | |
|---|---|---|
| 10,503,516 B1 | 12/2019 | Faibish et al. |
| 10,509,676 B1 | 12/2019 | Bassov et al. |
| 10,924,511 B2 | 2/2021 | Talukdar et al. |
| 10,990,565 B2 | 4/2021 | Faibish et al. |
| 2017/0199707 A1 | 7/2017 | Varghese et al. |
| 2020/0134047 A1 | 4/2020 | Bassov et al. |
| 2020/0134049 A1 | 4/2020 | Bassov et al. |
| 2020/0349117 A1 | 11/2020 | Faibish et al. |
| 2020/0349132 A1 | 11/2020 | Gonczi et al. |
| 2021/0132813 A1 | 5/2021 | Shabi et al. |
| 2021/0216511 A1 | 7/2021 | Ranchal et al. |
| 2024/0012731 A1 | 1/2024 | Segal et al. |

OTHER PUBLICATIONS

Prosecution History from U.S. Appl. No. 18/497,635, dated Aug. 26, 2024 through Oct. 28, 2024, 23 pp.
Wikipedia, "Entropy (information theory)", Wikipedia The Free Encyclopedia, Dec. 18, 2023, 25 pp., Retrieved from the Internet on January from URL: https://en.wikipedia.org/wiki/Entropy_(information_theory).
U.S. Appl. No. 18/497,635, filed Oct. 30, 2023, naming inventors Singh.
Extended Search Report from counterpart European Application No. 24179835.4 dated Oct. 22, 2024, 10 pp.

*Primary Examiner* — Jorge A Casanova
(74) *Attorney, Agent, or Firm* — Shumaker & Sieffert, P.A.

(57) ABSTRACT

Techniques are described for creating more efficient chunkfiles through the use of entropy metrics. In some examples, processing circuitry may determine an entropy value for each of a plurality of data chunks to obtain a corresponding plurality of entropy values. In some examples, processing circuitry may reorganize, based on the corresponding plurality of entropy values, the plurality of data chunks to obtain a reorganized plurality of data chunks. In some examples, processing circuitry may compress the reorganized plurality of data chunks to obtain a compressed chunkfile. In some examples, processing circuitry may store the compressed chunkfile superseding the plurality of data chunks.

20 Claims, 4 Drawing Sheets

SORTED ENTROPY CHUNKS FOR HIGHER SPACE REDUCTION

CLAIM OF PRIORITY

This application is a continuation filing of U.S. patent application Ser. No. 18/497,635, filed 30 Oct. 2023, the entire contents of which is incorporated herein by reference.

TECHNICAL FIELD

This disclosure relates to data platforms for computing systems.

BACKGROUND

Data platforms that support computing applications require the execution of various tasks, including periodically repeating customer tasks, background tasks, and overhead tasks, all of which support the customer's direct or indirect objectives as well as the overall efficiency of the data platform. Space utilization, compression efficiency and computational resources (e.g., CPU cycles) may all be wasted when data is compressed into highly random chunkfiles. A chunk is a fragment of information used in many file formats. A chunkfile is a set of data having multiple chunks embodied therein. Each of the multiple chunks include stored data. A chunk may contain multiple files, one file, a portion of a file, or portions of multiple files, depending on how such files are written to a data store. For example, a large file may consume an entire chunk, whereas multiple small files may fit within a single chunk. In another example, a very large file may consume more space than is allocated for a single chunk, and therefore, a single very large file may span across multiple chunks. Regardless, once data is "chunked" into multiple chunks, a chunkfile may be generated from the multiple chunks or a compressed chunkfile may be generated from the multiple chunks. A chunk is sometimes referred to as a "data chunk."

Generally, each chunk may contain a header specifying parameters such as the type of chunk, size etc. A variable data portion follows the chunk header which may be decoded using the parameters in the header. Decoding the variable data portion permits the underlying information corresponding to files within a chunk to be recovered. Chunks which are compressed into chunkfiles are often utilized for archive data and/or static data, which is not commonly modified, although this is not a technical requirement to create chunks from such files and compressing chunks into chunkfiles. Moreover, chunkfiles are commonly compressed to increase storage efficiency, however, compression is not a technical requirement for using chunks or creating chunkfiles from multiple chunks.

SUMMARY

Aspects of this disclosure describe techniques for creating more efficient chunkfiles through the use of entropy metrics. The use of such entropy metrics as applied to a data platform opens the door to many other optimizations for the creation and management of chunkfiles within the file system. For instance, the use of entropy metrics may support improved malware detection, security enhancements, machine learning classification of data, encryption effectiveness, and so forth.

In the context of data platforms, entropy is a measure of randomness or disorder. Generally, greater randomness, and thus higher disorder, results in lesser compression efficiency for information stored onto a file system. When applied to a data platform, the use of entropy may facilitate greater compressibility of stored data through the use of one or more techniques described by this disclosure.

In some examples, processing circuitry may determine an entropy value for one or more data chunks. Processing circuitry may, in these and other examples, sort the data chunks into increasing order using the entropy value of each corresponding chunk. Processing circuitry may compress each of the one or more ordered data chunks into a chunkfile. For example, positioning each of the one or more data chunks adjacent to each other (e.g., next to each other) based on the entropy value of each chunk may allow a compression algorithm to obtain greater compression rates and thus, the compressed chunkfile may be stored by the file system more efficiently.

In some examples, data chunks having similar entropy values which are positioned together yields greater opportunities for pattern finding by the compression algorithm, resulting in greater reductions of storage space for the compressed chunkfile. In some examples, data chunks having similar entropy values which are positioned together enables the compression algorithm to adjust smaller length codes, resulting in a smaller compressed chunkfile that consumes less storage space compared to compressing randomly ordered chunkfiles.

Processing circuitry may, in some instances, migrate or reorganize data chunks having similar entropy values into one chunkfile, increasing or decreasing order of entropy. In some examples, steady state data is reorganized into chunkfiles having data chunks arranged by increasing or decreasing order of entropy. Processing circuitry may compress data chunks into chunkfiles using at least one of *.gzip, *.zip, *.xz, and/or *.bzip2 compression schemes. Different machine learning and/or deep learning models may utilize different types of entropy to determine an entropy value for a chunk or file. In some examples, bit entropy and/or byte entropy are calculated. Processing circuitry may use a calculated bit entropy and/or byte entropy value to assess whether or not a chunk or file is encrypted and/or compressed. Processing circuitry may use the calculated bit entropy and/or byte entropy value to assess potential compressibility. In some examples, processing circuitry uses a calculated bit entropy and/or byte entropy value to assess a probability of malware within the chunk or file. Processing circuitry may, in some examples, use a calculated bit entropy and/or byte entropy value to generate a heat map representing entropy of a chunk or file.

In one instance, various aspects of the techniques are directed to a method. The exemplary method may include determining, by processing circuitry of a data platform, an entropy value for each of a plurality of data chunks to obtain a corresponding plurality of entropy values. The method may include reorganizing, by the processing circuitry and based on the corresponding plurality of entropy values, the plurality of data chunks to obtain a reorganized plurality of data chunks. Continuing with this example, the method may compress, by the processing circuitry, the reorganized plurality of data chunks to obtain a compressed chunkfile. The exemplary method may further store, by the processing circuitry, the compressed chunkfile superseding the plurality of data chunks.

In another instance, various aspects of the techniques are directed to a data platform having processing circuitry, a storage system, a chunkfile manager, a compression manager, and non-transitory computer readable media. In such an example, the instructions, when executed by the processing circuitry, configure the processing circuitry of the data platform to perform various operations. For instance, the instructions may configure the processing circuitry to determine an entropy value for each of a plurality of data chunks to obtain a corresponding plurality of entropy values. In such an example, the instructions may configure the processing circuitry to reorganize, by the chunkfile manager and based on the corresponding plurality of entropy values, the plurality of data chunks to obtain a reorganized plurality of data chunks. Continuing with this example, the instructions may configure the processing circuitry to compress, by the compression manager, the reorganized plurality of data chunks to obtain a compressed chunkfile. In this example of the data platform, the instructions may configure the processing circuitry to store, by the storage system, the compressed chunkfile superseding the plurality of data chunks within the storage system.

In another instance, various aspects of the techniques are directed to computer-readable storage media having instructions that, when executed, configure processing circuitry to perform various operations. In such an example, the instructions, when executed, may configure processing circuitry to determine an entropy value for each of a plurality of data chunks to obtain a corresponding plurality of entropy values. In this example, the instructions, when executed, may configure processing circuitry to reorganize, based on the corresponding plurality of entropy values, the plurality of data chunks to obtain a reorganized plurality of data chunks. Continuing with this example, the instructions, when executed, may configure processing circuitry to compress the reorganized plurality of data chunks to obtain a compressed chunkfile. In this example of computer-readable storage media, the instructions, when executed, may configure processing circuitry to store the compressed chunkfile superseding the plurality of data chunks.

BRIEF DESCRIPTION OF THE DRAWINGS

Like reference characters denote like elements throughout the text and figures.

DETAILED DESCRIPTION

Figure 1:
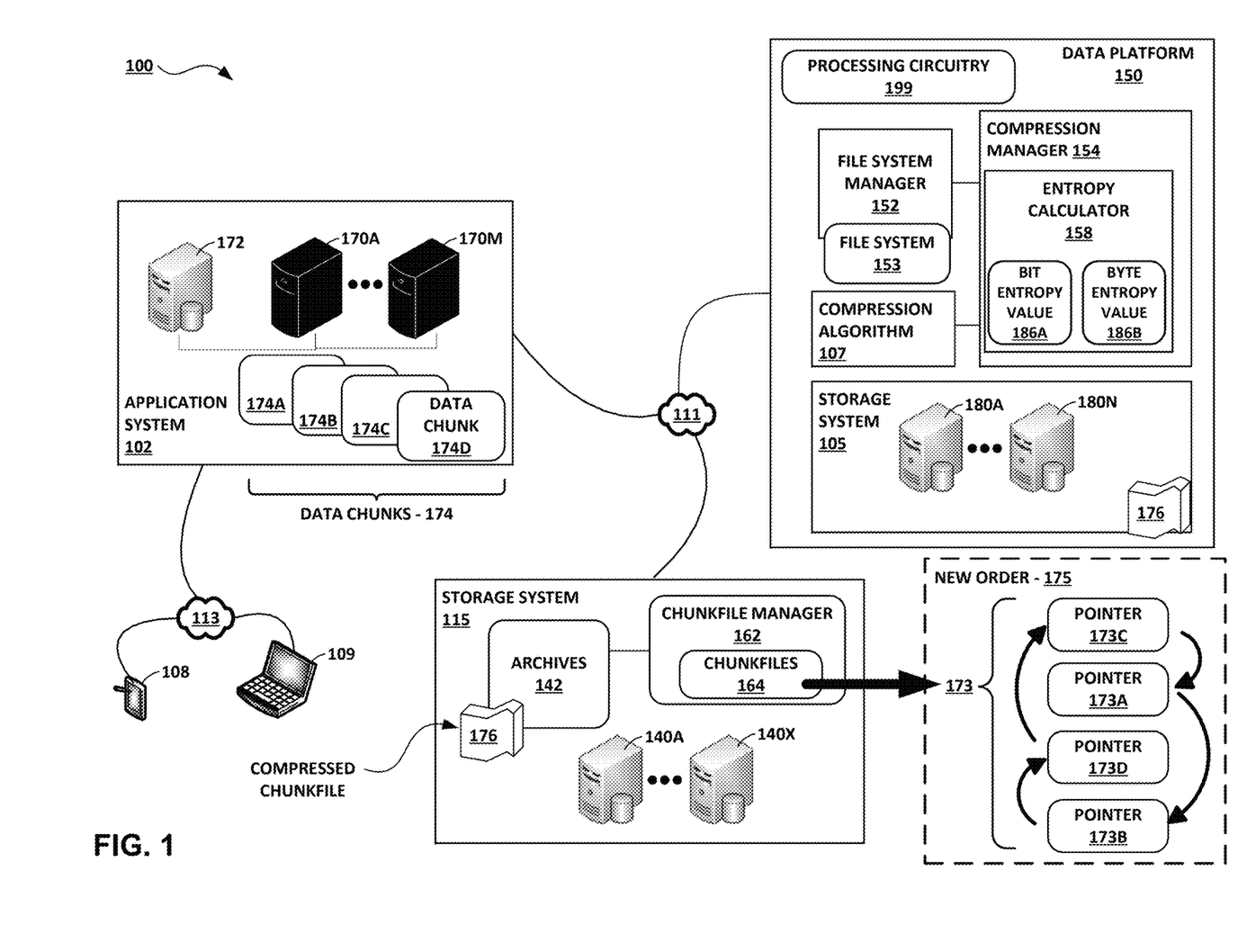
FIG. 1 is a block diagram illustrating an example system that sorts chunkfiles according to entropy to attain greater space reduction, in accordance with one or more techniques of the present disclosure.

FIG. 1 is a block diagram illustrating an example system that sorts chunkfiles according to entropy to attain greater space reduction, in accordance with one or more techniques of the present disclosure. In the example of FIG. 1, a system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical devices, virtual computing devices, and/or database servers 172 that execute computational workloads for the applications or services. Application system 102 includes multiple data chunks 174 having information to be stored. In the example of FIG. 1, there are multiple data chunks 174, including each of data chunks 174A, 174B, 174C, and 174D (collectively "data chunks 174").

In the example of FIG. 1, application system 102 includes application servers 170A-170M (collectively, "application servers 170") connected via a network with database server 172 implementing a database. Database server 172 may include one or more virtual machines, containers, Kubernetes pods each including one or more containers, bare metal processes, and/or other types of computing devices capable of executing work and storing information. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, healthcare software, or other types of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, healthcare software, or other types of applications. Enterprise applications may be delivered as a service from external cloud service providers or other providers, executed natively on application system 102, or both.

In the example of FIG. 1, system 100 includes a data platform 150 that provides a file system 153 and archival functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

In the example of FIG. 1, system 100 includes a data platform 150 that provides a file system 153 and archival functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. As depicted here, system storage 115 is represented as being collocated with data platform 150.

Data platform 150 includes storage system 105 having one or more storage devices 180A-180N (collectively, "storage devices 180"). Storage devices 180 may represent one or more physical or virtual computer and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media.

In some examples, each of storage devices 180 may include system memory. In some examples, each of storage devices 180 may be a storage server, a network-attached storage (NAS) device, or may represent disk storage for a computer device. Storage system 105 may be a redundant array of independent disks (RAID) system. In some examples, one or more of storage devices 180 are both compute and storage devices that execute software for data platform 150, such as file system manager 152 and compression manager 154 in the example of system 100, and store objects and metadata for data platform 150 to storage media. In some examples, separate compute devices (not shown) execute software for data platform 150, such as file system manager 152 and compression manager 154 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In some examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

In some examples, data platform 150 may implement and offer multiple storage domains to one or more tenants or to segregate workloads or storage demands that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Archives 142 or snapshots created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment.

Such network devices or components may be operatively inter-coupled, thereby providing for the exchange of information between computers, devices, or other components (e.g., between one or more client devices or systems and one or more computer/server/storage devices or systems). Each of the devices or systems illustrated in FIG. 1 may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIGS. 1 and 2 or otherwise on network 113 and/or network 111 may be in a remote location relative to one or more other illustrated devices or systems.

Application system 102, using file system 153 provided by data platform 150, generates objects and other data that file system manager 152 creates, manages, and causes to be stored to storage system 105. For this reason, application system 102 may alternatively be referred to as a "source system," and file system 153 for application system 102 may alternatively be referred to as a "source file system." Application system 102 may for some purposes communicate directly with storage system 105 via network 111 to transfer objects, and for some purposes communicate with file system manager 152 via network 111 to obtain objects or metadata indirectly from storage system 105.

In some examples, file system manager 152 generates and stores metadata to storage system 105. The collection of data stored to storage system 105 and used to implement file system 153 is referred to herein as file system data. In some examples, file system data may include data chunks 174 and chunkfiles 164 at various intermediate stages of compression, encryption, and storage. A compressed chunkfile 176 may be stored within storage system 105, 115 and/or stored via archives 142. In some examples, file system data may include chunkfiles 164 in a completed stage of compression, encryption, and storage. File system data may include the aforementioned metadata and objects. Metadata may include file system objects, tables, trees, or other data structures; metadata generated to support deduplication; or metadata to support snapshots. Objects that are stored may include files, virtual machines, databases, applications, pods, containers, any of workloads, system images, directory information, or other types of objects used by application system 102. Objects of different types and objects of the same type may be deduplicated with respect to one another. In some examples, chunkfiles 164 replace data chunks 174 in a lossless compression format.

Aspects of this disclosure describe techniques for creating more efficient chunkfiles 164 through the use of entropy metrics. The use of such entropy metrics as applied to a data platform 150 opens the door to many other optimizations for the creation and management of chunkfiles 164 within the file system 153. For instance, the use of entropy metrics may support improved malware detection, security enhancements, machine learning classification of data, encryption effectiveness, and so forth.

In the context of data platform 150, entropy is a measure of randomness or disorder. Generally, greater randomness, and thus higher disorder, results in lesser compression efficiency for information stored onto a file system 153. When applied to data platform 150, the use of entropy may facilitate greater compressibility of stored data using one or more techniques described by this disclosure.

In some examples, processing circuitry 199 may determine an entropy value 186 for one or more data chunks 174. Processing circuitry 199 may, in these and other examples, sort the data chunks 174 into increasing order using the entropy value 186 of each corresponding chunk. Processing circuitry 199 may compress each of the one or more ordered data chunks 174 into a chunkfile 164. For example, positioning each of the one or more data chunks adjacent to each other (e.g., next to each other) based on the entropy value of each chunk may allow a compression algorithm to obtain greater compression rates and thus, the compressed chunkfile 176 may be stored by the file system 153 more efficiently.

In some examples, data chunks 174 having similar entropy values 186 which are positioned together yields greater opportunities for pattern finding by the compression algorithm, resulting in greater reductions of storage space for the compressed chunkfile 176. In some examples, data chunks 174 having similar entropy values 186 which are positioned together enables the compression algorithm 107 to adjust smaller length codes, resulting in a smaller compressed chunkfile 176 that consumes less storage space compared to compressing randomly ordered chunkfiles.

Processing circuitry may, in some instances, migrate or reorganize data chunks 174 having similar entropy values 186 into one chunkfile 164, increasing or decreasing order of entropy. In some examples, steady state data is reorganized into chunkfiles 164 having data chunks arranged by increasing or decreasing order of entropy. Processing circuitry 199 may compress data chunks 174 into chunkfiles using at least one of *.gzip, *.zip, *.xz, and/or *.bzip2 compression algorithms 107. Different machine learning and/or deep learning models may utilize different types of entropy to determine an entropy value 186 for a data chunk 174 or a file which is to be included in a chunkfile 164. In some examples, bit entropy value 186A and/or byte entropy value 186B are calculated. Processing circuitry 199 may use a calculated bit entropy 186A value and/or byte entropy value 186B to assess whether or not a data chunk 174 or file is encrypted and/or compressed. Processing circuitry 199 may use the calculated bit entropy 186A value and/or byte entropy value 186B to assess potential compressibility. In some examples, processing circuitry 199 uses a calculated bit entropy 186A value and/or byte entropy value 186B to assess a probability of malware within the data chunk 174 or file. Processing circuitry 199 may, in some examples, use a calculated bit entropy 186A value and/or byte entropy value 186B to generate a heat map representing entropy of a data chunk 174 or file.

In one instance, various aspects of the techniques are directed to a method. The exemplary method may include determining, by processing circuitry 199 of a data platform 150, an entropy value 186 for each of a plurality of data chunks 174 to obtain a corresponding plurality of entropy values 186. The method may include reorganizing, by the processing circuitry 199 and based on the corresponding plurality of entropy values 186, the plurality of data chunks 174 to obtain a reorganized plurality of data chunks 174. Continuing with this example, the method may compress, by the processing circuitry 199, the reorganized plurality of data chunks 174 to obtain a compressed chunkfile 176. The exemplary method may further store, by the processing circuitry 199, the compressed chunkfile 176 superseding the plurality of data chunks 174.

In another instance, various aspects of the techniques are directed to a data platform 150 having processing circuitry 199, a storage system 105, 115, a chunkfile manager 162, a compression manager 154, and non-transitory computer readable media. In such an example, the instructions, when executed by the processing circuitry 199, configure the processing circuitry of the data platform 150 to perform various operations. For instance, the instructions may configure the processing circuitry 199 to determine an entropy value 186 for each of a plurality of data chunks 174 to obtain a corresponding plurality of entropy values 186. In such an example, the instructions may configure the processing circuitry 199 to reorganize, by the chunkfile manager 162 and based on the corresponding plurality of entropy values 186, the plurality of data chunks 174 to obtain a reorganized plurality of data chunks 174. Continuing with this example, the instructions may configure the processing circuitry 199 to compress, by the compression manager 154, the reorganized plurality of data chunks 174 to obtain a compressed chunkfile 176. In this example of the data platform 150, the instructions may configure the processing circuitry 199 to store, by the storage system 105, 115, the compressed chunkfile 176 superseding the plurality of data chunks 174 within the storage system 105, 115.

In another instance, various aspects of the techniques are directed to computer-readable storage media having instructions that, when executed, configure processing circuitry 199 to perform various operations. In such an example, the instructions, when executed, may configure processing circuitry 199 to determine an entropy value 186 for each of a plurality of data chunks 174 to obtain a corresponding plurality of entropy values 186. In this example, the instructions, when executed, may configure processing circuitry 199 to reorganize, based on the corresponding plurality of entropy values 186, the plurality of data chunks 174 to obtain a reorganized plurality of data chunks 174. Continuing with this example, the instructions, when executed, may configure processing circuitry 199 to compress the reorganized plurality of data chunks to obtain a compressed chunkfile 176. In this example of computer-readable storage media, the instructions, when executed, may configure processing circuitry 199 to store the compressed chunkfile 176 superseding the plurality of data chunks 174.

In the example of FIG. 1, data platform 150 includes compression manager 154 that provides compression services on behalf of data platform 150. Compression manager 154 may select and use one or more available compression algorithms 107. Compression manager 154 may obtain and/or evaluate one or more properties 106 of the data to be compressed by compression manager 154. In some examples, compression manager 154 organizes, compresses, and stores information generated by data platform 150. In some examples, compression manager 154 organizes, compresses, and stores information generated by one or more mobile devices 108 and one or more client devices 109. Compression manager 154 includes entropy calculator 158 for calculating entropy values of data chunks 174. In some examples, compression manager 154 calculates bit value entropy values 186A. In some examples, compression manager 154 calculates byte value entropy values 186B. Calculated bit value entropy values 186A and byte value entropy values 186B are collectively referred to as "entropy values 186." In some examples, compression manager 154 selects a compression algorithm 107 based on calculated entropy values 186.

Multiple pointers 173A, 173B, 173C, and 173D (collectively "pointers 173") point to and/or reference the data chunks 174. In the operation for reorganizing the plurality of data chunks 174 to obtain a reorganized plurality of data chunks 174, the collection of data chunks 174 may be reorganized into a new order 175 by rearranging pointers 173 linking to, pointing to, and/or referencing each of the respective data chunks 174. Reordering pointers 173 to data chunks 174 rather than rearranging data chunks 174 directly may save significant computational resources by negating the need to read and rewrite the data chunks to and from a storage system 105, 115. For example, reordering and subsequently updating and/or rewriting the pointers 173 to the storage system 105, 115 using new order 175 may be significantly less computationally demanding due to the very small size of pointers 173 when compared with a relatively large size of data chunks 174.

As discussed above, space utilization, compression efficiency and computational resources (e.g., CPU cycles) may all be wasted when data is compressed into highly random chunkfiles. A compression manager 154 may yield greater storage efficiency by applying pre-processing, albeit at the cost of complexity and overhead for the data platform 150. Data files have varying degrees of randomness. For instance, structured file formats tend to exhibit a high degree of order due to the internal structure of such files being highly repetitive. Conversely, encrypted files and compressed files tend to exhibit a high degree of randomness or disorderedness. Encrypted files tend to be disordered as a result of the encryption algorithms which introduce purposeful disorder and complexity into a file as a security measure. Compressed files tend to be disordered due to a selected compression algorithm 107 having replaced repetitive bit sequences with syntax representing the original data contents and structure in an effort to reduce storage space. Compression manager 154 may introduce increased order (e.g., decrease entropy) prior to compression by rearranging data chunks 174. For example, the data chunks 174 may be organized into an ascending order or a descending order, which places data chunks with similar entropy values adjacent to one another. In such a way, the re-ordered data chunks 174 may exhibit less entropy overall when compared with the data chunks 174 prior to being reorganized. The lower total entropy of the collection of data chunks 174 being used to create a compressed chunkfile 176 may result in lower storage space consumption due to obtaining greater compression efficiency.

In accordance with various aspects of the techniques described in this disclosure, compression manager 154 may perform a series of operations to reorganize the data chunks 174 into a new order which yields greater compression efficiency. For example, compression manager 154 may obtain and/or retrieve the data chunks 174 from application system 102 and/or file system 153. In such an example, compression manager 154 may receive pointers 173 to all of the data chunks 174 stored locally which are selected for use in creating a new chunkfile 164. Continuing with this example, compression manager 154 may reorder the pointers 173 and/or reorganize some identifier representative of the data chunks 174 into the new order 175. In such an example, entropy calculator 158 of compression manager 154 may compute the entropy value 186 for each respective data chunk 174 by resolving the pointers 173 and/or reference to each underlying data chunk 174. Continuing with this example, compression manager 154, having the computed entropy value 186 for each respective data chunk 174, sorts, reorders, rearranges, and/or re-sequences the pointers to the computed entropy value 186 for each of the respective data chunks 174, resulting in the new order 175. Compression manager 154 may apply compression sequentially to the data chunks 174 by dereferencing (e.g., following) the pointers 173 in the new order 175, sequentially moving through the data chunks 174 according to the new order 175 specified by the pointers to create a compressed chunkfile 176. The compressed chunkfile 176 is then stored, reducing total storage system consumption.

For instance, where the compressed chunkfile 176 consumes less storage resource than the data chunks 174 the compressed chunkfile 176 replaces, total storage consumption will be reduced as the compressed chunkfile 176 replaces and/or supersedes the corresponding data chunks 174. Because the compressed chunkfile 176 is formed from chunkfiles 174 reordered according to the computed entropy value 186 for each of the respective data chunks 174, the storage space consumed by the compressed chunkfile 176 may be reduced when compared with a compressed chunkfile formed from data chunks 174 in a randomly occurring order.

Entropy of data informs the randomness and/or "disorderedness" (e.g., to what extent the data is disordered) embedded within such data. Based on concepts in thermodynamics and applied to information theory by Claude Elwood Shannon, entropy provides a mechanism by which to systematically measure the randomness of data stored by a file system. Shannon's theory defines a data communication system composed of three elements: a source of data, a communication channel, and a receiver. Shannon states that the fundamental problem of communication is for the receiver to be able to identify what data was generated by the source, based on the signal it receives through the channel. Shannon asserts that an absolute mathematical limit exists with regard to how well data from a source can be compressed onto a perfectly noiseless channel using lossless compression. Lossless compression is a class of data compression that allows the original data to be perfectly reconstructed from the compressed data with no loss of information whatsoever. Lossless compression is possible because most real-world data exhibits statistical redundancy. Conversely, lossy compression permits reconstruction only of an approximation of the original data, though usually with greatly improved compression rates and therefore reduced file storage sizes.

Shannon defined entropy by the following formula:

$$H = -1*\text{sum}(p_i * \log(p_i)),$$

where $p_i$ is the frequency of each symbol i (the sum) and the result H is in bits per symbol if the log base is 2. Therefore, if an entropy value is close to 8, say 7.98 by way of example, the entropy value would imply that in each byte of data, 7.98 bits are random in nature. Encrypted and compressed files having an entropy value close to 8 suggests that a compressed file would not be further compressible. Conversely, consider another example having a file which is filled with all zeros. Such a file will have an entropy value close to 0, suggesting the file is highly compressible.

In some examples, processing circuitry 199 selects the plurality of data chunks 174 from storage system 105, 115 for creating the chunkfile. In some examples, in response to selecting the plurality of data chunks 174 from storage system 105, 115 for creating the chunkfile 164, processing circuitry 199 determines an entropy value 186 for each of the plurality of data chunks 174 selected. In some examples, processing circuitry 199 determines each entropy value 186 by calculating the entropy value 186 for each data chunk 174 according to the formula H=−1*sum ($p_i$*log ($p_i$)). In some examples, the term H represents entropy value 186 as calculated by processing circuitry 199. In some examples, the term i represents an index for each of a plurality of symbols. In some examples, the term $p_i$ is a frequency for each of the plurality of symbols i. In some examples, entropy value 186 represented by the term H is in bits per symbol when the log base is 2.

In some examples, processing circuitry 199 selects a compression algorithm 107 based on calculated entropy values 186 as determined by the entropy calculator 158. In some examples, processing circuitry 199 selects a compression algorithm 107 from a plurality of compression algorithms 107 based on properties of the plurality of data chunks 174. For example, compression manager 154 may select a compression algorithm 107 based on properties of the data chunks 174 as obtained by the compression manager 154. In some examples, the compression manager 154 compresses the chunkfiles 174 using the compression algorithm selected 107. Processing circuitry may apply any one of a variety of compression algorithms to generate and/or create the compressed chunkfile. In some examples, processing circuitry compresses the plurality of data chunks 174 using new order 175 to generate compressed chunkfile 176.

In some examples, the compression algorithm is selected based on determinable properties of the plurality of data chunks. In some examples, the compression algorithm 107 is selected based on properties of the chunkfile 164 created from the plurality of data chunks 174 prior to compressing the chunkfile 164 into the compressed chunkfile 176. In some examples, the compression algorithm 107 is selected based on properties of underlying files stored to the storage system which are embodied within the plurality of data chunks 174. For example, music files stored in analog wave format may preferably utilize a different compression algorithm 107 than digitized music. Video files may preferably utilize a different compression algorithm 107 than database backup files. Data processing files (e.g., such as *.doc, *.docx, *.xls, google docs, *.txt, etc.) may preferably utilize a different compression algorithm 107 than *.pdf files and image files. In some examples, the properties of the plurality of data chunks 174 are determined after reorganizing and/or reordering the plurality of data chunks 174 within the storage system using the new order 175. In some examples, the properties of the plurality of data chunks 174 are determined prior to reorganizing and/or reordering the plurality of data chunks.

Storage system 115 includes one or more storage devices 140A-140X (collectively, "storage devices 140"). Storage devices 140 may represent one or more physical or virtual computer and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a computer device. Storage system 115 may include a redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed and managed by a cloud storage provider and referred to as a "cloud storage system." Example cloud storage providers include, e.g., AMAZON WEB SERVICES (AWS™) by AMAZON, INC., AZURE® by MICROSOFT, INC., DROPBOX™ by DROPBOX, INC., ORACLE CLOUD™ by ORACLE, INC., and GOOGLE CLOUD PLATFORM™ (GCP) by GOOGLE, INC. In some examples, storage system 115 is co-located with storage system 105 in a data center, on-prem, or in a private, public, or hybrid private/public cloud. Storage system 115 may be considered a "backup" or "secondary" storage system for primary storage system 105. Storage system 115 may be referred to as an "external target" for archives 142. Where deployed and managed by a cloud storage provider, storage system 115 may be referred to as "cloud storage."

Storage system 115 may include one or more interfaces for managing transfer of data between storage system 105 and storage system 115 and/or between application system 102 and storage system 115. Data platform 150 that supports application system 102 relies on primary storage system 105 to support latency sensitive applications. However, because storage system 105 is often more difficult or expensive to scale, data platform 150 may use secondary storage system 115 to support secondary use cases such as backup and archive. In general, a file system backup is a copy of file system 153 to support protecting file system 153 for quick recovery, often due to some data loss in file system 153, and a file system archive ("archive") is a copy of file system 153 to support longer term retention and review. The "copy" of file system 153 may include such data as is needed to restore or view file system 153 in its state at the time of the backup or archive.

Compression manager 154 may archive file system data for file system 153 at any time in accordance with archive policies that specify, for example, archive periodicity and timing (daily, weekly, etc.), which file system data is to be archived, an archive retention period, storage location, access control, and so forth. An initial archive of file system data corresponds to a state of the file system data at an initial archive time (the archive creation time of the initial archive). The initial archive may include a full archive of the file system data or may include less than a full archive of the file system data, in accordance with archive policies. For example, the initial archive may include all objects of file system 153 or one or more selected objects of file system 153 including data chunks 174 in an ordered state or an unordered state.

One or more subsequent incremental archives of the file system 153 may correspond to respective states of the file system 153 at respective subsequent archive creation times, i.e., after the archive creation time corresponding to the initial archive. A subsequent archive may include an incremental archive of file system 153. A subsequent archive may correspond to an incremental archive of one or more objects of file system 153 including data chunks 174 in an ordered state or an unordered state. Some of the file system data for file system 153 stored on storage system 105 at the initial archive creation time may also be stored on storage system 105 at the subsequent archive creation times. A subsequent incremental archive may include data that was not previously archived to storage system 115. File system data that is included in a subsequent archive may be deduplicated by compression manager 154 against file system data that is included in one or more previous archives, including the initial archive, to reduce the amount of storage used. (Reference to a "time" in this disclosure may refer to dates and/or times. Times may be associated with dates. Multiple archives may occur at different times on the same date, for instance.)

In system 100, compression manager 154 may coordinate the ordering, compression, and storage of information onto one or more data stores. In some examples, compression manager 154 re-orders data chunks 174 and compresses data chunks 174 into chunkfiles 164. In some examples, compression manager operates in collaboration with chunkfile manager 162 to order, compress, and store data chunks 174 as chunkfiles 164. In some examples, entropy calculator 158 calculates an entropy value 186 for each of multiple data chunks 174. In some examples, chunkfile manager 162 reorders the multiple data chunks 174 in ascending or descending order according to their corresponding entropy value 186. In the example of FIG. 1, data chunks 174A, 174B, 174C, and 174D are reorganized into a new order 175 according to their corresponding entropy value 186 resulting in the order of data chunks 174C, 174A, 174D, and 174B. In some examples, chunkfile manager 162 compresses the reordered data chunks 174C, 174A, 174D, and 174B into a chunkfile 164. In the example of FIG. 1, a compressed chunkfile 176 is created by the chunkfile manager 162 compressing the reordered data chunks 174C, 174A, 174D, and 174B using the new order 175 for the data chunks 174 into a single compressed chunkfile 176. Compressed chunkfile 176 may be stored by storage system 105 using storage devices 180 and/or stored within archives 142 of storage system 115. In some examples, chunkfile 164 is written to the archives 142. In some examples, chunkfile 164 replaces data chunks 174. In some examples, chunkfile 164 supersedes data chunks 174 by updating references and metadata pointing to data chunks 174 to point to chunkfile 164 instead.

In some examples, processing circuitry calculates an entropy value 186 for each of a plurality of data chunks 174 using entropy calculator 158. In some examples, in response to determining, an entropy value 186 for each of a plurality of data chunks 174, processing circuitry 199 organizes the plurality of data chunks 174 into new order 175 according to entropy value 186 for each of the plurality of data chunks 174. In some examples, chunkfile manager 162 writes the plurality of data chunks 174 to storage system 105, 115. In some examples, pointers 173 referencing the plurality of data chunks 174 are written to storage system 105, 115 using new order 175 into which the plurality of data chunks 174 were reorganized and/or reordered. In some examples, compression manager 154 generates compressed chunkfile 176 by compressing the plurality of data chunks 174 using the new order 175 of the pointers 173 referencing the plurality of data chunks 174. In some examples, compression manager 154 replaces and/or supersedes the plurality of data chunks 174 on storage system 105, 115 with compressed chunkfile 176. Stated differently, compressed chunkfile 176 written to storage system 105, 115 replaces prior variants of the chunkfile 164 in an uncompressed format and replaces prior variants of the data chunks 174 which are now embodied within the compressed chunkfile 176. In some examples, prior variants of the chunkfile 164 are overwritten. In some examples, prior variants of the chunkfile 164 are superseded by updating pointers referencing the prior variants of the chunkfile 164 within storage system 105, 115 to instead reference the newly compressed chunkfile 176. In such an example, replacing the prior variants of data using the compressed chunkfile 176 frees up storage system space and may provide for a more efficient data storage environment within data platform 150.

In some examples, processing circuitry rewrites and/or updates pointers 173 to the plurality of data chunks 174 to storage system 105, 115 in an ascending order or a descending order, using the new order 175 determined by chunkfile manager 162. In some examples, each of the pointers 173 referencing each of the plurality of data chunks stored by the storage system 105, 115 are stored as nodes within a linked list. In some examples, processing circuitry sequentially organizes the nodes within the linked list corresponding to the pointers 173 referencing each of the plurality of data chunks 174 stored by the storage system 105, 115 into one of the descending order or the ascending order according to establish a new order 175 for the plurality of data chunks 174. In such a way, a sequential arrangement of the plurality of data chunks 174 may be established without incurring the computational burden of relocating the plurality of data chunks 174 on the physical medium.

Figure 2:
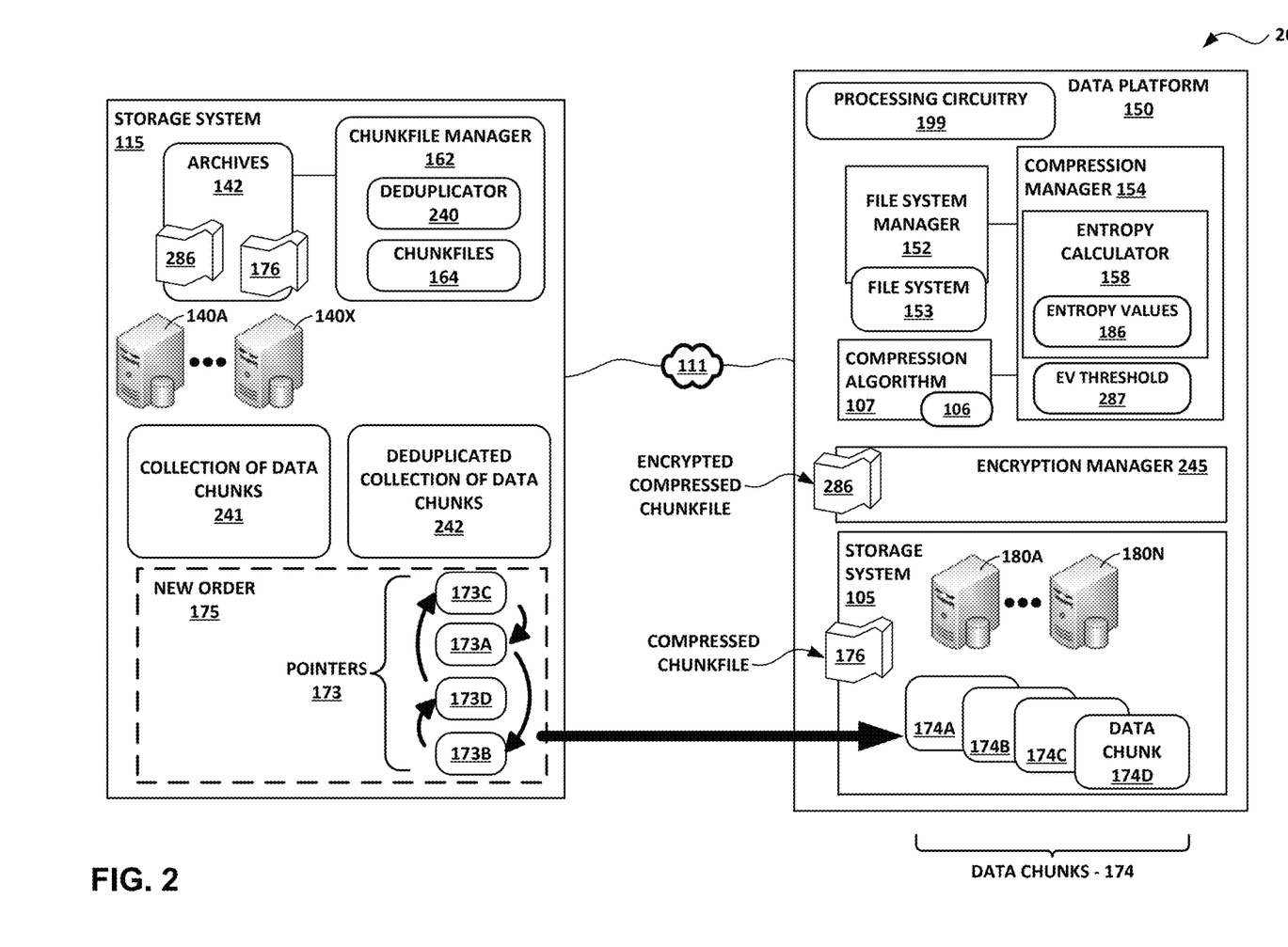
FIG. 2 is a block diagram illustrating another example system that provides a more efficient data storage environment with data deduplication, encryption, and entropy thresholds, in accordance with one or more techniques of the present disclosure.

FIG. 2 is a block diagram illustrating another example system 200 that provides a more efficient data storage environment with data deduplication, encryption, and entropy thresholds, in accordance with one or more techniques of the present disclosure. System 200 of FIG. 2 may be described as an example or alternate implementation of system 100 of FIG. 1. One or more aspects of FIG. 2 may be described herein within the context of FIG. 1. In the example of FIG. 2, system 200 includes network 111, data platform 150 and storage system 115. In the example of FIG. 2, network 111, data platform 150, and storage system 115 may correspond to network 111, data platform 150, and storage system 115 of FIG. 1. Although the data platform 150 and storage system 115 of FIG. 2 may apply techniques in accordance with this disclosure, including providing application services to one or more mobile devices 108 and one or more client devices 109 via a network 113 of FIG. 1. Different instances of data platform 150 and/or storage system 115 may be deployed by different cloud storage providers, the same cloud storage provider, by an enterprise, or by other entities.

In the example of FIG. 2, data platform 150 includes an encryption manager 245 having an encrypted compressed chunkfile 286 created by encryption manager 245. In some examples, encrypted compressed chunkfile 286 is created by encryption manager 245 and stored via storage system 105 and/or storage system 115. Within data platform 150, compression manager 154 may include entropy calculator 158 to calculate entropy value(s) 186. Compression manager 154 may include a configurable specified entropy value threshold 287. In some examples, entropy value threshold 287 provides a configurable value which compression manager 154 may evaluate whether or not to compress a data chunk 174, data block, and/or file stored by storage system 105, 115.

In the example of FIG. 2, storage system 115 includes archives 142 which may store compressed chunkfile 176 and/or encrypted compressed chunkfile 286. Storage system 115 may include a chunkfile manager 162 configured with a deduplicator 240. In some examples, deduplicator 240 removes identical or otherwise un-needed copies of files, data blocks, and/or data chunks 174. In some examples, deduplicator 240 operates on a collection of data chunks 241 to create a deduplicated collection of data chunks 242. In some examples, chunkfile manager 162 selects data chunks 174 from the collection of data chunks 241. In some examples, chunkfile manager 162 selects data chunks 174 from a deduplicated collection of data chunks 242.

In some examples, processing circuitry deduplicates, by deduplicator 240, a collection of data chunks 241 stored by storage system 105, 115 to create a deduplicated collection of data chunks 242. In some examples, processing circuitry 199 of data platform 150 selects the plurality of data chunks 174 to be included in a chunkfile 164 from the deduplicated collection of data chunks 174.

Data deduplication is a process that eliminates excessive copies of data and significantly decreases storage capacity requirements. Deduplication may be run as an inline process as the data is being written into the storage system 105, 115 and/or as a background process to eliminate duplicates after the data is written to disk or otherwise stored by storage system 105, 115. In some examples, data deduplication is run on data files prior to creating the data chunks 174. In some examples, data deduplication is run on the data chunks 174 to eliminate one or more identical copies of data chunks 174, resulting in a deduplicated collection of data chunks 242. In some examples, data deduplication is applied to a first data chunk 174 identified as having one or more identical copies by defining the one or more identical copies of the first data chunk 174 as references and/or pointers to the first data chunk. In such an example, the data within the first data chunk 174 is retained in an unmodified form and the one or more identical copies are replaced with the references and/or the pointers to the first data chunk 174, significantly reducing space consumed on the storage system 105, 115 by the first data chunk 174 and the one or more identical copies of the first data chunk 174.

Consider, for example, a job applicant submitting their resume to multiple job postings on a job listing platform. Each of the resumes are likely identical, and yet, they are submitted multiple times. As an illustrative example, one copy of the multiple identical resumes is retained by the job listing platform with one or more identical copies of the resume being redefined as references or pointers to the one copy of the resume that was retained. In another example, consider two users of a music streaming platform, each having downloaded a song into their personal library which is stored within the cloud by the music streaming platform. Similar to the example with the resumes, only one copy of the song needs to be retained, with the second copy of the song for the second user being redefined as a pointer and/or reference to the first copy of the song retained by the music streaming platform, thus significantly reducing space consumption for the underlying storage system 105, 115.

In some examples, processing circuitry generates, by encryption manager 245, an encrypted compressed chunkfile 286. In some examples, processing circuitry 199 encrypts compressed chunkfile 176 as a single file to generate encrypted compressed chunkfile 286. Encrypted data tends to have a very high entropy value and therefore, it may be preferable to compress the reorganized data chunks 174 into a compressed chunkfile 176 prior to applying encryption.

In some examples, the entirety of the compressed chunkfile 176 is encrypted and a non-encrypted version of the compressed chunkfile 176 is replaced within the storage system with the encrypted compressed chunkfile 286 variant of the compressed chunkfile 176. However, encryption may be optionally performed prior to creating the chunkfile and/or prior to compressing the chunkfile. In some examples, some or all files which make up each of the plurality of data chunks 174 are encrypted. In some examples, the plurality of data chunks 174 are each encrypted prior to creating the compressed chunkfile. In some examples, the chunkfile is created from the plurality of data chunks 174 and the chunkfile is encrypted prior to being compressed. In some examples, the compressed chunkfile is created by compressing the plurality of data chunks 174 into a single chunkfile and processing circuitry encrypts the compressed chunkfile to generate the encrypted compressed chunkfile.

In some examples, processing circuitry reorders the plurality of data chunks 174 into the ascending order or the descending order based on entropy values 186 for the plurality of data chunks 174. In some examples, in response to reordering the plurality of data chunks 174 into the ascending order or the descending order, processing circuitry 199 rewrites and/or updates pointers 173 to the plurality of data chunks 174 to storage system 105, 115 in the ascending order or the descending order.

In some examples, the plurality of data chunks 174 are organized, reorganized, and/or reordered into the descending order or the ascending order to improve compression efficiency. For example, experimentation has shown that efficiency gains exceeding 10% have been realized using the one or more techniques described herein when the plurality of data chunks 174 are reordered into a descending order or an ascending order as written to physical storage media or as referenced by pointers 173 to the plurality of data chunks 174. In some examples, processing circuitry accesses the pointers in the new order 175 to retrieve the plurality of data chunks 174 and compresses the plurality of data chunks 174 into compressed chunkfile 176. In some examples, the plurality of data chunks 174 are loaded into local memory for compression algorithm 107 using the new order 175 of the pointers 173 and the plurality of data chunks 174 are processed in-line and/or processed sequentially. Stated differently, the plurality of data chunks 174 are processed by compression algorithm 107 in the order in which they are loaded into memory corresponding to the new order 175 into which the pointers 173 were reorganized. In some examples, pointers 173 are maintained within a linked list and the plurality of data chunks 174 are reorganized by updating the order of the pointers 173 to the plurality of data chunks 174 within the linked list. A linked list may provide a linear collection of data elements having order which is not based upon a physical placement of the data elements within storage system 105, 115, rather, the linked list may be organized as a data structure consisting of a collection of nodes, each having a pointer 173 to one of the plurality of data chunks 174, in which the collection of nodes represent a sequence. The nodes may therefore be reorganized within the linked list, altering the order of the sequence, without relocating physical placement for any of the plurality of data chunks 174. In some examples, pointers 173 are maintained within a file system 153 and the plurality of data chunks 174 are reorganized by updating the order of the pointers 173 to the plurality of data chunks 174 within as maintained by the file system 153.

Compression efficiency gains exhibit a general inverse correlation with calculated entropy value 186 of each compressed unit, regardless of whether the compressed unit is a file, data block, data chunk 174, or chunkfile 164. In some examples, entropy values 186 are calculated within a range of 1 through 8. In other examples, the entropy value 186 is calculated as a value between 0 and 1. Regardless of the range or scale used, a higher entropy value 186 generally correlates with a greater measure of disorderedness and/or randomness, and thus, yields a lower compression efficiency.

Conversely, a lower entropy value 186 generally correlates with a lower measure of disorderedness and/or randomness, and thus, a higher compression efficiency may be realized by the compression manager 154. For instance, an entropy value of "2" in a range from 1 through 8 or "0.2" in a range from 0 to 1, may indicate low entropy (e.g., a lower measure of disorderedness and/or randomness), and thus, the compression algorithm 107 selected may attain greater compression efficiencies by leveraging the internal structures within a low entropy data chunk 174. However, an entropy value of "8" in a range from 1 through 8 or "0.99" in a range from 0 to 1, may indicate exceedingly high entropy (e.g., a high measure of disorderedness and/or randomness), and thus, the compression algorithm 107 selected may yield little to no compression efficiencies due to the randomness and lack of structure within a high entropy data chunk 174. Counter-intuitively, compression algorithms applied to high entropy data chunks 174 may result in a "compressed" data chunk having a size greater than a corresponding non-compressed variant of the same data chunk 174. Stated differently, the compression algorithm 107 may increase the size of the data chunk 174 when stored within its "compressed" form due to a high measure of disorderedness and/or randomness. The reason for this is because more space is needed to store the syntax and data describing replaced elements within the data chunk 174 when stored in a compressed format rather than merely storing the same data, without any compression syntax, in an original and uncompressed form.

In some examples, data chunks 174 are therefore evaluated against a specified and configurable entropy value threshold 287 prior to applying a compression algorithm 107 to the data chunk 174. For example, a data chunk 174 calculated to have entropy value 186 of "6" may exceed a configurable specified entropy value threshold 287 of "5" for the entropy value 186. In such an example, processing circuitry 199 may affirmatively filter out the data chunk 174 from inclusion in the chunkfile 164. In some examples, processing circuitry 199 may eliminate the data chunk 174 having a calculated entropy value 186 which fails to satisfy entropy value threshold 287 from the plurality of data chunks 174 to be compressed into the compressed chunkfile 176. In some examples, the plurality of data chunks 174 are selected as a subset or portion of a collection of data chunks 241 based on the selected subset of data chunks 174 having a calculated entropy value 186 less than entropy value threshold 287.

In some examples, a linked list is used to sequentially arrange the pointers 173 referencing each of the plurality of data chunks 174 in an ascending or descending order. In such a way, a sequential arrangement of the plurality of data chunks 174 may be processed using the new order 175 established for the plurality of data chunks 174 based on entropy values corresponding to each of the plurality of data chunks. Stated differently, data chunks 174 with similar entropy values may be positioned adjacent to one another by reorganizing the pointers 173 using the new order 175. Higher efficiency compression may be obtained subsequent to reordering the plurality of chunks into the descending order or the ascending order by increasing the length and quantity of single value data runs spanning one or more of the plurality of data chunks 174 when using run-length encoding (RLE). Run-length encoding is a lossless compression technique in which sequences that embody redundant data are stored as a single data value representing the repeated block of redundant data and how many times the redundant data appears within an underlying data chunk 174 or within a data sequence spanning multiple data chunks 174. In some examples, during a subsequent decoding and/or decompression phase, the original uncompressed data of the data chunk 174 can be reconstructed exactly using the run-length encoding information. Reordering the plurality of data chunks 174 into a descending order or an ascending order according to a corresponding entropy value 186 calculated for each of the plurality of data chunks 174 may yield higher compression efficiencies by reducing total disorderedness and/or randomness across the span of newly organized data chunks 174. Stated differently, data chunks 174 organized sequentially within the storage system 105, 115 according to entropy values 186 for the data chunks 174 may reduce disorderedness and/or randomness for the multiple data chunks 174 which are to make up the chunkfile 164. The higher efficiency compression may result from similar data structures being placed adjacently, similar data sequences being placed adjacently, and/or similar file formats being placed adjacently.

In some examples, processing circuitry calculates an entropy value 186 for each data chunk 174 within a collection of data chunks 241 stored by storage system 105, 115. In some examples, processing circuitry compares, via chunkfile manager 162, each data chunk 174 within the collection of data chunks 241 with an entropy value threshold 287. In some examples, in response to comparing each data chunk 174 within collection of data chunks 241 with entropy value threshold 287, processing circuitry 199 selects the plurality of data chunks 174 from collection of data chunks 241 based on the plurality of entropy value 186 for each data chunk 174 selected satisfying entropy value threshold 287. Stated differently, the portion or subset of data chunks 174 from collection of data chunks 241 which satisfies entropy value threshold 287 may be selected for inclusion within chunkfile 164, inclusion within compressed chunkfile 176, and/or inclusion within encrypted compressed chunkfile 286.

In some examples, entropy value threshold 287 is configured based on a trade-off between computational costs and resources required to compress the data chunks 174 and/or chunkfiles 164 and the compression efficiency gains yielded by performing any of the one or more techniques described herein. For instance, a configurable entropy value threshold 287 of "2" for an entropy value range of 1 through 8 may ensure that all selected data chunks 174 will exhibit high efficiency compression gains once compressed, thus providing sufficient returns when measured as storage system 105, 115 space savings compared with computational resources required to realize such storage system 105, 115 space savings. However, such a low entropy value threshold of "2" may leave desirable potential storage system 105, 115 space savings unrealized. In a variable computational demand environment, such as a data platform 150 which encounters higher computational loads on certain periodic cycles (e.g., nightly, weekly, end of quarter, end of year, etc.), the entropy value threshold 287 may be dynamically configured such that more possible storage system 105, 115 space savings are realized during low computational demand periods by consuming excess or otherwise unused computational capacity of the data platform 150. Similarly, the compression demands may be classified, defined, relegated, or otherwise configured as "backend" or "overhead" computational loads which are configured for processing during low demand periods for the data platform 150, thus allowing more computational efficiency to be realized by accepting higher computational costs, albeit during low computational demand periods.

Figure 3:
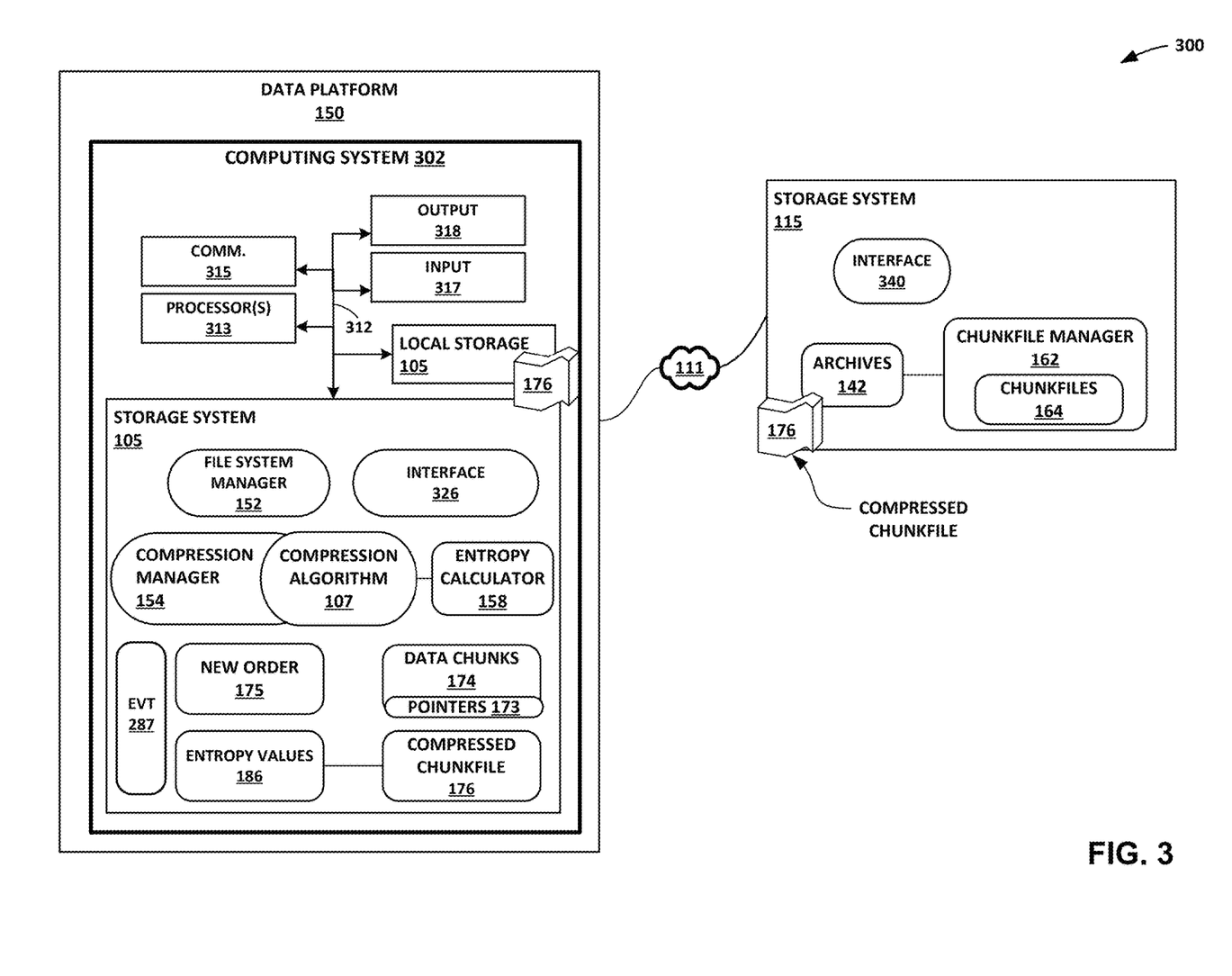
FIG. 3 is a block diagram illustrating an example system, in accordance with techniques of this disclosure.

FIG. 3 is a block diagram illustrating example system 300, in accordance with techniques of this disclosure. System 300 of FIG. 3 may be described as an example or alternate implementation of system 100 of FIG. 1 or system 200 of FIG. 2. One or more aspects of FIG. 3 may be described herein within the context of FIGS. 1 and 2.

In the example of FIG. 3, system 300 includes network 111, data platform 150 implemented by computing system 302, and storage system 115. In FIG. 3, network 111, data platform 150, and storage system 115 may correspond to network 111, data platform 150, and storage system 115 of FIGS. 1 and 2. Although only one archive storage system 115 is depicted, data platform 150 may apply techniques in accordance with this disclosure using multiple instances of archive storage system 115. The different instances of storage system 115 may be deployed by different cloud storage providers, the same cloud storage provider, by an enterprise, or by other entities.

Computing system 302 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 302 represents a cloud computing system, server farm, and/or server cluster (or portion thereof) that provides services to other devices or systems. In other examples, computing system 302 may represent or be implemented through one or more virtualized compute instances (e.g., virtual machines, containers) of a cloud computing system, server farm, data center, and/or server cluster.

In the example of FIG. 3, computing system 302 may include one or more communication units 315, one or more input devices 317, one or more output devices 318, and one or more storage devices of local storage system 105. Storage system 105 includes interface module 326, file system manager 152, compression manager 154, entropy calculator 158, and compression algorithm 107. Storage system 105 may create or generate information during operation such that storage system 105 may further include data chunks 174, a new order 175 for the data chunks 174, entropy values 186 calculated for the data chunks 174, and/or one or more compressed chunkfiles 176. Storage system 105 may optionally store chunkfiles 164 and encrypted compressed chunkfiles. One or more of the devices, modules, storage areas, or other components of computing system 302 may be interconnected to enable inter-component communications (physically, communicatively, and/or operatively). In some examples, such connectivity may be provided through communication channels (e.g., communication channels 312), which may represent one or more of a system bus, a network connection, an inter-process communication data structure, or any other method for communicating data.

One or more processors 313 of computing system 302 may implement functionality and/or execute instructions associated with computing system 302 or associated with one or more modules illustrated in FIG. 3 and described below. One or more processors 313 may be, may be part of, and/or may include processing circuitry that performs operations in accordance with one or more aspects of the present disclosure. Examples of processors 313 include microprocessors, application processors, display controllers, auxiliary processors, one or more sensor hubs, and any other hardware configured to function as a processor, a processing unit, or a processing device. Computing system 302 may use one or more processors 313 to perform operations in accordance with one or more aspects of the present disclosure using software, hardware, firmware, or a mixture of hardware, software, and firmware residing in and/or executing at computing system 302.

One or more communication units 315 of computing system 302 may communicate with devices external to computing system 302 by transmitting and/or receiving data, and may operate, in some respects, as both an input device and an output device. In some examples, communication units 315 may communicate with other devices over a network. In other examples, communication units 315 may send and/or receive radio signals on a radio network such as a cellular radio network. In other examples, communication units 315 of computing system 302 may transmit and/or receive satellite signals on a satellite network. Examples of communication units 315 include a network interface card (e.g., such as an Ethernet card), an optical transceiver, a radio frequency transceiver, a GPS receiver, or any other type of device that can send and/or receive information. Other examples of communication units 315 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 317 may represent any input devices of computing system 302 not otherwise separately described herein. Input devices 317 may obtain, generate, receive, and/or process input. For example, one or more input devices 317 may generate or receive input from a network, a user input device, or any other type of device for detecting input from a human or machine.

One or more output devices 318 may represent any output devices of computing system 302 not otherwise separately described herein. Output devices 318 may generate, present, and/or process output. For example, one or more output devices 318 may generate, present, and/or process output in any form. Output devices 318 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 105 within computing system 302 may store information for processing during operation of computing system 302, such as random-access memory (RAM), Flash memory, solid-state disks (SSDs), hard disk drives (HDDs), etc. Storage devices may store program instructions and/or data associated with one or more of the modules described in accordance with one or more aspects of this disclosure. One or more processors 313 and one or more storage devices may provide an operating environment or platform for such modules, which may be implemented as software, but may in some examples include any combination of hardware, firmware, and software. One or more processors 313 may execute instructions and one or more storage devices of storage system 105 may store instructions and/or data of one or more modules. The combination of processors 313 and local storage system 105 may retrieve, store, and/or execute the instructions and/or data of one or more applications, modules, or software. Processors 313 and/or storage devices of local storage system 105 may also be operably coupled to one or more other software and/or hardware components, including, but not limited to, one or more of the components of computing system 302 and/or one or more devices or systems illustrated as being connected to computing system 302.

File system manager 152 may perform functions relating to providing file system 153, as described above with respect to FIG. 1 and FIG. 2. File system manager 152 may generate and manage file system metadata 332 for structuring file system data 330 for file system 153, and store file system metadata 332 and file system data 330 to local storage system 105. File system metadata 332 may include one or more trees that describe objects within file system 153 and the file system 153 hierarchy and can be used to write or retrieve objects within file system 153. File system metadata 332 may reference data chunks 174 indirectly through the use of pointers 173 which are followed to retrieve the referenced data chunk 174. File system metadata 332 may be referenced by the compression manager 154 in support of performing chunkfile operations and management. File system manager 152 may interact with and/or operate in conjunction with one or more modules of computing system 302, including interface module 326 and compression manager 154.

Compression manager 154 may perform compression functions relating to chunking files and data into data chunks 174, calculating entropy values 186 via entropy calculator 158, and organizing data chunks 174 into a new order 175, compressing selected data chunks 174 into compressed chunkfiles 176, and encrypting data chunks 174, encrypting chunkfiles 164, and/or encrypting compressed chunkfiles 176. as described above with respect to FIG. 1 and FIG. 2, including operations described above with respect to coordinating with chunkfile manager 162.

Interface module 326 may execute an interface by which other systems or devices may determine operations of file system manager 152, compression manager 154, and/or chunkfile manager 162. Another system or device may communicate via an interface of interface module 326 to specify one or more entropy thresholds 287.

System 300 may be modified to implement an example of system 100 of FIG. 1 or system 200 of FIG. 2. In some examples of modified system 300, storage system 105 and/or 115 may perform encryption operations using encryption manager 245. In some examples of modified system 300, storage system 105 and/or 115 may perform deduplication operations using deduplicator 240. In some examples of modified system 300, storage system 105 and/or 115 include both compression manager 154 and chunkfile manager 162 to perform one or more techniques described above with reference to FIG. 1 and/or FIG. 2.

In some examples, data platform 150 includes processing circuitry (e.g., processor(s) 313), a storage system 105, 115, a chunkfile manager 162, a compression manager, 154, and non-transitory computer readable media. In some examples, the instructions, when executed by the processing circuitry, configure the processing circuitry to perform operations. In some examples, in response to a determination of an entropy value 186 for each of a plurality of data chunks 174, processing circuitry organizes the plurality of data chunks 174 into a new order 175. In some examples, the plurality of data chunks 174 are organized according to entropy value 186 for each of the plurality of data chunks 174. For instance, the plurality of data chunks 174 may be organized or reorganized into an ascending or descending order. In some examples, processing circuitry writes and/or updates pointers 173 to the plurality of data chunks 174 to storage system 105, 115 using new order 175 into which the plurality of data chunks 174 were organized. In some examples, processing circuitry generates, using compression manager 154, a compressed chunkfile. In some examples, processing circuitry compresses the plurality of data chunks 174 using the new order 175. In some examples, the compression manager replaces the plurality of data chunks 174 on storage system 105, 115 with compressed chunkfile 176.

Although the techniques described in this disclosure are primarily described with respect to an archive function performed by a compression manager 154 and chunkfile manager 162 of a data platform 150, similar techniques may additionally or alternatively be applied for a backup, replica, clone, or snapshot functions performed by the data platform 150. In such cases, compression manager 154 and chunkfile manager 162 may operate on backups, replicas, clones, snapshots, or other data archived by, stored within, or accessible to data platform 150.

Figure 4:
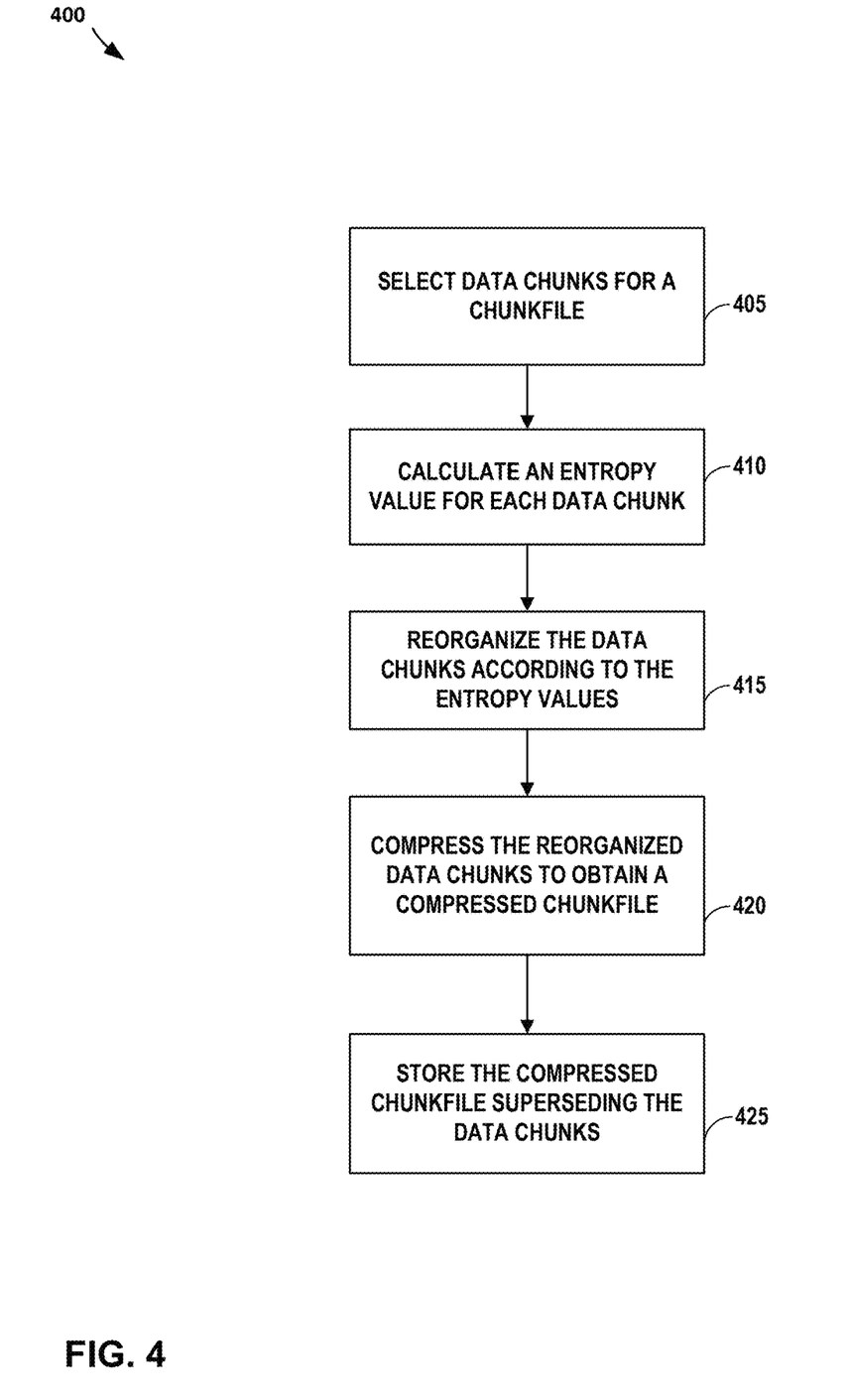
FIG. 4 is a flow chart illustrating an example mode of operation for a computing device to create more efficient chunkfiles through the use of entropy metrics, in accordance with techniques of this disclosure.

FIG. 4 is a flow chart illustrating an example mode of operation for a computing device to create more efficient chunkfiles through the use of entropy metrics, in accordance with techniques of this disclosure. The mode of operation is described with respect to system 100 of FIG. 1, system 200 of FIG. 2, and computing system 302 and storage system 105, 115 of FIG. 3.

Data platform 150 may select data chunks for a chunkfile (405). For example, processing circuitry of data platform 150 may select the plurality of data chunks 174 from a collection of data chunks. Data platform 150 may calculate an entropy value for each data chunk (410). In some examples, processing circuitry determines an entropy value for each data chunk to be included within a chunkfile being created.

Data platform 150 may reorganize the data chunks according to the entropy values (415). For example, in response to determining an entropy value for each of a plurality of data chunks, processing circuitry may reorganize the plurality of data chunks into a new order according to the entropy value calculated for each of the plurality of data chunks to obtain a reorganized plurality of data chunks. Data platform 150 may compress the reorganized data chunks to obtain a compressed chunkfile (420). Data platform 150 may store the compressed chunkfile superseding the data chunks (425). For example, processing circuitry may store the compressed chunkfile to a storage system superseding the plurality of data chunks which were used to create the compressed chunkfile. In some examples, processing circuitry replaces the plurality of data chunks which were used to create the compressed chunkfile with the compressed chunkfile. In some examples, processing circuitry updates pointers to the plurality of data chunks which were used to create the compressed chunkfile with one or more pointers to the compressed chunkfile.

In some examples, processing circuitry deduplicates a collection of data chunks stored by the storage system to create a deduplicated collection of data chunks. In some examples, processing circuitry selects the plurality of data chunks which are used in creating the compressed chunkfile from the deduplicated collection of data chunks. In some examples, processing circuitry generates an encrypted compressed chunkfile. In some examples, processing circuitry encrypts the compressed chunkfile as a single file to generate the encrypted compressed chunkfile.

In some examples, processing circuitry calculates the entropy value for each data chunk within a collection of data chunks stored by the storage system. Processing circuitry of the data platform may compare, using the chunkfile manager, each data chunk within the collection of data chunks with an entropy value threshold. In response to comparing each data chunk within the collection of data chunks with the entropy value threshold, processing circuitry may select the plurality of data chunks from the collection of data chunks based on the entropy value for each data chunk selected as satisfying the entropy value threshold.

Encryption may be applied to the compressed chunkfile to improve security of the information stored to the storage system. In some examples, processing circuitry encrypts the compressed chunkfile as a single file to obtain an encrypted compressed chunkfile. It may be preferable to encrypt the chunkfile subsequent to compression as compressing a previously encrypted chunkfile would yield little to no compression efficiency gains due to the high entropy (e.g., high disorder) of encrypted data. In some examples, processing circuitry selects a compression algorithm from a plurality of compression algorithms based on properties of the plurality of data chunks. In some examples, processing circuitry compresses the reorganized plurality of data chunks to obtain the compressed chunkfile using the compression algorithm selected.

In some examples, processing circuitry reorganizes pointers referencing each of the plurality of data chunks stored by a storage system into one of a descending order or an ascending order, according to the entropy value for each of the plurality of data chunks. In some examples, in response to reorganizing the pointers referencing each of the plurality of data chunks into the ascending order or the descending order, processing circuitry may update the pointers referencing each of the plurality of data chunks within the storage system into the ascending order or the descending order. In some examples, the pointers referencing each of the plurality of data chunks stored by the storage system are stored as nodes within a linked list. In some examples, processing circuitry sequentially organizes the nodes within the linked list corresponding to the pointers referencing each of the plurality of data chunks stored by the storage system into one of the descending order or the ascending order according to establish a new order for the plurality of data chunks. In such a way, an ascending or descending sequence of data chunks may be established based on the entropy values obtained without relocating the data chunks within the storage system by reorganizing the pointers and/or nodes referencing the data chunks.

In some examples, processing circuitry may select the plurality of data chunks from a data store for creating the chunkfile. In some examples, in response to selecting the plurality of data chunks from the data store for creating the chunkfile, processing circuitry may determine the entropy value for each of the plurality of data chunks selected. For instance, processing circuitry may calculate the entropy values or otherwise obtain the entropy values. In some examples, processing circuitry may calculate the entropy value using an entropy formula. In some examples, processing circuitry calculates each entropy value according to the formula: $H=-1*\text{sum}(p_i*\log(p_i))$. In some examples, the term H represents entropy value 186 as calculated by processing circuitry 199. In some examples, the term i represents an index for each of a plurality of symbols. In some examples, the term $p_i$ is a frequency for each of the plurality of symbols i. In some examples, entropy value 186 represented by the term H is in bits per symbol when the log base is 2.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    selecting, by processing circuitry of a data platform, a plurality of data chunks from a data store for creating a chunkfile;
    in response to selecting the plurality of data chunks from the data store for creating the chunkfile, determining, by the processing circuitry of the data platform, an entropy value for each of the plurality of data chunks selected to obtain a corresponding plurality of entropy values by, at least in part, calculating, via the processing circuitry, the entropy value based on a determined frequency of each of a plurality of symbols representative of each of the plurality of data chunks selected;
    reorganizing, by the processing circuitry and based on the corresponding plurality of entropy values, the plurality of data chunks to obtain a reorganized plurality of data chunks;
    compressing, by the processing circuitry, the reorganized plurality of data chunks to obtain a compressed chunkfile; and
    storing, by the processing circuitry, the compressed chunkfile superseding the plurality of data chunks.

2. The method of claim 1, further comprising:
    deduplicating, by a chunkfile manager, a collection of data chunks stored by a storage system to create a deduplicated collection of data chunks; and
    selecting, by the processing circuitry of the data platform, the plurality of data chunks from the deduplicated collection of data chunks.

3. The method of claim 1, further comprising:
    calculating, by the processing circuitry of the data platform, the entropy value for each data chunk within a collection of data chunks stored by a storage system;
    comparing, by a chunkfile manager, each data chunk within the collection of data chunks with an entropy value threshold; and
    in response to comparing each data chunk within the collection of data chunks with the entropy value threshold, selecting, by the processing circuitry of the data platform, the plurality of data chunks from the collection of data chunks based on the entropy value for each data chunk selected as satisfying the entropy value threshold.

4. The method of claim 1, further comprising:
    encrypting, by processing circuitry, the compressed chunkfile as a single file to obtain an encrypted compressed chunkfile.

5. The method of claim 1, further comprising:
    reorganizing, by the processing circuitry, pointers referencing each of the plurality of data chunks stored by a storage system into one of a descending order or an ascending order, according to the entropy value for each of the plurality of data chunks; and
    responsive to reorganizing the pointers referencing each of the plurality of data chunks into the ascending order or the descending order, updating, by the processing circuitry of the data platform, the pointers referencing each of the plurality of data chunks within the storage system into the ascending order or the descending order.

6. The method of claim 5:
wherein each of the pointers referencing each of the plurality of data chunks stored by the storage system are stored as nodes within a linked list; and
wherein the method further comprises sequentially organizing the nodes within the linked list corresponding to the pointers referencing each of the plurality of data chunks stored by the storage system into one of the descending order or the ascending order according to establish a new order for the plurality of data chunks.

7. The method of claim 1, further comprising:
selecting a compression algorithm from a plurality of compression algorithms based on properties of the plurality of data chunks; and
compressing the reorganized plurality of data chunks to obtain the compressed chunkfile using the compression algorithm selected.

8. The method of claim 1, wherein:
determining the entropy value for each of the plurality of data chunks selected includes calculating, via the processing circuitry, the entropy value according to a following formula:

$$H = -1 * \mathrm{sum}(p_i * \log(p_i));$$

wherein H represents the entropy value as calculated by the processing circuitry;
wherein i represents an index for each of the plurality of symbols representative of each of the plurality of data chunks selected;
wherein $p_i$ is the frequency for each of the plurality of symbols i; and
wherein the entropy value H is in bits per symbol when a log base is 2.

9. A data platform comprising:
processing circuitry;
a storage system;
a chunkfile manager;
a compression manager;
non-transitory computer readable media; and
wherein instructions, when executed by the processing circuitry, configure the processing circuitry to:
select, by the processing circuitry of the data platform, a plurality of data chunks from the storage system for creating a chunkfile;
in response to selecting the plurality of data chunks from the storage system for creating the chunkfile, determine, by the processing circuitry of the data platform, an entropy value for each of the plurality of data chunks selected to obtain a corresponding plurality of entropy values by, at least in part, calculating, via the processing circuitry, the entropy value based on a determined frequency of each of a plurality of symbols representative of each of the plurality of data chunks selected;
reorganize, by the processing circuitry and based on the corresponding plurality of entropy values, the plurality of data chunks to obtain a reorganized plurality of data chunks;
compress, by the processing circuitry, the reorganized plurality of data chunks to obtain a compressed chunkfile; and store, by the processing circuitry to the storage system, the compressed chunkfile superseding the plurality of data chunks.

10. The data platform of claim 9, wherein the instructions cause the processing circuitry to:
deduplicate, by the chunkfile manager, a collection of data chunks stored by the storage system to create a deduplicated collection of data chunks; and
select, by the processing circuitry of the data platform, the plurality of data chunks from the deduplicated collection of data chunks.

11. The data platform of claim 9, wherein the instructions cause the processing circuitry to:
calculate, by an entropy calculator of the data platform, the entropy value for each data chunk within a collection of data chunks stored by the storage system;
compare, by the chunkfile manager, each data chunk within the collection of data chunks with an entropy value threshold; and
in response to a comparison of each data chunk within the collection of data chunks with the entropy value threshold, the instructions cause the processing circuitry to select the plurality of data chunks from the collection of data chunks based on the entropy value for each data chunk selected as satisfying the entropy value threshold.

12. The data platform of claim 9, wherein the instructions cause the processing circuitry to:
reorganize, by the chunkfile manager of the data platform, pointers referencing each of the plurality of data chunks stored by the storage system into one of a descending order or an ascending order, according to the entropy value for each of the plurality of data chunks; and
responsive to a reorganization of the pointers referencing each of the plurality of data chunks into the ascending order or the descending order, the instructions cause the processing circuitry to update the pointers referencing each of the plurality of data chunks within the storage system into the ascending order or the descending order.

13. The data platform of claim 12:
wherein each of the pointers referencing each of the plurality of data chunks stored by the storage system are stored as nodes within a linked list; and
wherein the instructions cause the processing circuitry to sequentially organize the nodes within the linked list corresponding to the pointers referencing each of the plurality of data chunks stored by the storage system into one of the descending order or the ascending order according to establish a new order for the plurality of data chunks.

14. The data platform of claim 9, wherein the instructions cause the processing circuitry to:
select a compression algorithm from a plurality of compression algorithms based on properties of the plurality of data chunks; and
compress the reorganized plurality of data chunks to obtain the compressed chunkfile using the compression algorithm selected.

15. The data platform of claim 9, wherein to determine the entropy value for each of the plurality of data chunks selected includes the instructions further configured to cause the processing circuitry to:

calculate, via the processing circuitry, the entropy value according to a following formula:

$$H = -1 * \text{sum}(p_i * \log(p_i));$$

wherein H represents the entropy value as calculated by the processing circuitry;

wherein i represents an index for each of the plurality of symbols representative of each of the plurality of data chunks selected;

wherein $p_i$ is the frequency for each of the plurality of symbols i; and wherein the entropy value H is in bits per symbol when a log base is 2.

16. Computer-readable storage media comprising instructions that, when executed, configure processing circuitry to:

select a plurality of data chunks from a data store for creating a chunkfile;

responsive to a selection of the plurality of data chunks from the data store for creating the chunkfile, determine an entropy value for each of the plurality of data chunks selected to obtain a corresponding plurality of entropy values by, at least in part, the processing circuitry configured by the instructions to calculate the entropy value based on a determined frequency of each of a plurality of symbols representative of each of the plurality of data chunks selected;

reorganize, by the processing circuitry and based on the corresponding plurality of entropy values, the plurality of data chunks to obtain a reorganized plurality of data chunks;

compress, by the processing circuitry, the reorganized plurality of data chunks to obtain a compressed chunkfile; and store, by the processing circuitry to the data store, the compressed chunkfile superseding the plurality of data chunks.

17. The computer-readable storage media of claim 16, wherein the instructions cause the processing circuitry to:

deduplicate a collection of data chunks stored by a storage system to create a deduplicated collection of data chunks; and select the plurality of data chunks from the deduplicated collection of data chunks.

18. The computer-readable storage media of claim 16, wherein the instructions cause the processing circuitry to:

calculate the entropy value for each data chunk within a collection of data chunks;

compare each data chunk within the collection of data chunks with an entropy value threshold; and in response to a comparison of each data chunk within the collection of data chunks with the entropy value threshold, the instructions cause the processing circuitry to select the plurality of data chunks from the collection of data chunks based on the entropy value for each data chunk selected as satisfying the entropy value threshold.

19. The computer-readable storage media of claim 16, wherein the instructions cause the processing circuitry to:

reorganize pointers referencing each of the plurality of data chunks stored by a storage system into one of a descending order or an ascending order, according to the entropy value for each of the plurality of data chunks; and responsive to a reorganization of the pointers referencing each of the plurality of data chunks into the ascending order or the descending order, the instructions cause the processing circuitry to update the pointers referencing each of the plurality of data chunks within the storage system into the ascending order or the descending order.

20. The computer-readable storage media of claim 16, wherein to determine the entropy value for each of the plurality of data chunks selected includes the instructions, when executed, to further cause the processing circuitry to:

calculate, via the processing circuitry, the entropy value according to a following formula:

$$H = -1 * \text{sum}(p_i * \log(p_i));$$

wherein H represents the entropy value as calculated by the processing circuitry;

wherein i represents an index for each of the plurality of symbols representative of each of the plurality of data chunks selected;

wherein $p_i$ is the frequency for each of the plurality of symbols i; and wherein the entropy value H is in bits per symbol when a log base is 2.

* * * * *